(12) United States Patent
Pfannenberg

(10) Patent No.: US 9,243,656 B2
(45) Date of Patent: Jan. 26, 2016

(54) SIGNALING DEVICE FOR EMITTING AN ACOUSTIC AND/OR VISUAL SIGNAL

(71) Applicant: Andreas Pfannenberg, Hamburg (DE)

(72) Inventor: Andreas Pfannenberg, Hamburg (DE)

(73) Assignee: PFANNENBERG GMBH, Hamburg (DE)

( * ) Notice: Subject to any disclaimer, the term of this patent is extended or adjusted under 35 U.S.C. 154(b) by 0 days.

(21) Appl. No.: 13/682,961

(22) Filed: Nov. 21, 2012

(65) Prior Publication Data

US 2013/0149072 A1 Jun. 13, 2013

(30) Foreign Application Priority Data

Nov. 22, 2011 (DE) .................. 10 2011 055 591

(51) Int. Cl.
| F16B 19/04 | (2006.01) |
| F16B 19/00 | (2006.01) |
| G08B 7/06 | (2006.01) |
| G08B 5/36 | (2006.01) |

(52) U.S. Cl.
CPC . *F16B 19/00* (2013.01); *G08B 7/06* (2013.01); *G08B 5/36* (2013.01)

(58) Field of Classification Search
CPC .............. F16B 19/00; G08B 7/06; G08B 5/36
USPC ................ 411/500; 292/56–59, 63, 64, 6
See application file for complete search history.

(56) References Cited

U.S. PATENT DOCUMENTS

| 745,888 | A | * | 12/1903 | Mcelwee ....................... 292/244 |
| 1,169,104 | A | * | 1/1916 | Turney ............................ 292/58 |
| 1,568,689 | A | * | 1/1926 | Nystrom ....................... 292/337 |
| 1,792,537 | A | * | 2/1931 | Irwin ............................. 411/349 |
| 2,095,271 | A | * | 10/1937 | Swanstrom ................... 411/551 |
| 2,235,949 | A | * | 3/1941 | Shaw .............................. 292/59 |
| 2,474,799 | A | * | 6/1949 | Dzus ............................. 411/555 |
| 2,554,962 | A | * | 5/1951 | Sochor ........................... 292/58 |
| 2,556,988 | A | * | 6/1951 | Swanson ....................... 411/549 |
| 2,975,667 | A | * | 3/1961 | Bross ............................ 411/521 |
| 3,080,633 | A | * | 3/1963 | Reddy .......................... 24/580.1 |
| 3,744,828 | A | * | 7/1973 | Goldberg ....................... 292/59 |
| 3,905,628 | A | * | 9/1975 | Lancaster ..................... 292/257 |
| 4,110,552 | A | * | 8/1978 | Lombardi ..................... 174/367 |
| 4,385,851 | A | * | 5/1983 | Bellamy ....................... 403/325 |
| 4,688,835 | A | * | 8/1987 | Wu ................................. 292/59 |
| 4,744,392 | A | * | 5/1988 | Tade et al. ...................... 138/89 |
| 5,275,029 | A | * | 1/1994 | Myers ............................ 70/128 |
| 5,368,427 | A | * | 11/1994 | Pfaffinger .................... 411/553 |
| 5,593,265 | A | * | 1/1997 | Kizer ............................ 411/552 |
| 6,127,935 | A | * | 10/2000 | Davidson et al. ........... 340/691.5 |
| 6,572,304 | B1 | * | 6/2003 | Hessling et al. .............. 403/321 |
| 6,659,513 | B1 | * | 12/2003 | Ramsauer ....................... 292/66 |
| 7,201,354 | B1 | * | 4/2007 | Lee ............................. 248/231.9 |
| 7,874,779 | B2 | * | 1/2011 | Csik et al. .................... 411/553 |
| 2007/0085347 | A1 | * | 4/2007 | Malkowski et al. ........... 292/59 |

FOREIGN PATENT DOCUMENTS

CN 2660828 Y 12/2004

* cited by examiner

*Primary Examiner* — Gary Estremsky
(74) *Attorney, Agent, or Firm* — Grogan, Tuccillo & Vanderleeden, LLP

(57) ABSTRACT

A signaling device for emitting an acoustic and/or visual signal includes a base housing body and an upper housing part. The upper housing part is connected to the base housing body and forms a receiving space, in which at least one electrical component assembly is disposed. The connection means includes one or more locking pins, which can be disposed in a retaining manner on the upper housing part. The locking pins include a shaft, which can be inserted into a respective assigned opening in the base housing body, and on which at least one catch is disposed. The locking pins can be locked in the base housing body with the catch via a rotation about a partial angle of a full circle.

11 Claims, 3 Drawing Sheets

SIGNALING DEVICE FOR EMITTING AN ACOUSTIC AND/OR VISUAL SIGNAL

CROSS REFERENCE TO RELATED APPLICATION

This application claims the benefit of German Patent Application Serial No. 102011055591.9, filed Nov. 22, 2011, entitled "SIGNALING DEVICE FOR EMITTING AN ACOUSTIC AND/OR VISUAL SIGNAL", herein incorporated by reference in its entirety.

DESCRIPTION

The present invention relates to a signaling device for emitting an acoustic and/or visual signal, comprising a base housing body and an upper housing part, wherein the upper housing part can be connected to the base housing body by means of connection means, and wherein a receiving space, in which at least one electrical component assembly is disposed, is formed by the base housing body and the upper housing part.

STATE OF THE ART

To connect an upper housing part to a base housing body of a signaling device, screws, which are guided through an opening in the upper housing part and which are screwed into a threaded hole in the base housing body, are commonly known. This creates the disadvantage that the screws must often be screwed across a plurality of thread turns, whereby the installation duration of signaling devices is extended undesirably. Upper housing parts, which are disposed on the base housing body on an edge with a joint, for example a film joint, are also known, and the upper housing part can be pivoted on the base housing body. The upper housing part can thus be transferred from an open position into a closed position, and can subsequently be screwed to the base housing body by means of two screws, in particular screws located opposite the film joint, for example.

Signaling devices for emitting acoustic and/or visual signals are known and are mounted on an accommodating body, for example on a wall, on a ceiling or, for example, on a housing for electronic components. A receiving space, in which an electrical component assembly is disposed, which can comprise an electronic board, for example, for generating an acoustic and/or a visual signal, is formed in the signaling device. For example, the signaling device can be formed as a siren and/or as a flash lamp. To contact the electrical component assembly, lines are guided into the base housing body and are connected to the electrical component assembly. To install the signaling device, the housing must be opened initially, so that the signaling device can be mounted on the accommodating body with the base housing body. The upper housing part is subsequently disposed on the base housing body again, so as to form a closed receiving space in the signaling device. The connection means for connecting the upper housing part to the base housing body thereby consist of screw elements.

A cover-housing quick fastener is known from DE 198 37 319 B4, and a plurality of through channels is provided in a base housing body, and a quick fastener sleeve is necessary, which can be inserted into an inlet cam in the through-channel by means of a lug on the jacket side. In addition, a connection screw, which must be screwed into the quick fastener sleeve, is required. The cover-housing quick fastener is thus formed in a complex manner, at least in the case of the initial assembly of the connection means, and the cover-housing quick fastener is thus only advantageous, when the upper housing part must be removed frequently from the base housing body during the service life of the housing.

A further closure for a housing comprising an upper housing part and a lower housing part is known from DE 88 06 796 U1. In the corners of the housing connection means are provided, which consist of a closing member and a locking bolt. It is furthermore necessary to dispose a pressure spring on the locking bolt, and appendages, which are molded to the locking bolt, can be inserted into insertion cams, which are positioned in the closing member. Cross pins are furthermore necessary to fasten the connection means in the base housing body, so that a more complex design also follows from the embodiment of the closure.

DE 40 33 109 C2 finally shows a further housing comprising locking elements for connecting an upper housing part to a base housing body, and locking sleeves are also necessary, which must be brought into contact with head bolts, so that a connection between the upper housing part and the base housing body is only formed by means of the multi-part design of the connection means.

DISCLOSURE OF THE INVENTION

It is the object of the present invention to create a signaling device comprising simplified connection means between an upper housing part and a base housing body, which are formed simply, can be disposed easily and can be operated easily.

The connection means comprise one or a plurality of locking pins, which can be disposed in a retaining manner on the upper housing part, wherein the locking pins comprise a shaft, which can be inserted into a respective assigned opening in the base housing body, and on which at least one catch is disposed, wherein the locking pins can be locked in the base housing body with the catch by means of a rotation about a partial angle of a full circle.

The invention relates to a connection means and to the arrangement of a connection means in a signaling device, and the connection means can be formed as a one-piece locking pin and the signaling device can comprise four locking pins, for example, which are disposed in respective housing corners, and by means of which the upper housing part is connected to the base housing body. Advantageously, the connection means are formed exclusively by means of the locking pins, that is, further components, such as connection sleeves, screws, etc. are not necessary for establishing a connection.

The locking pins are disposed in a retaining manner in the upper housing part and the locking pins have a shaft, which extends in the direction towards the base housing body. The locking pins can be inserted into an opening in the base housing body via their shaft, without a screwing movement with a plurality of rotations being necessary for this purpose. The locking pins are thereby held in the upper housing part such that they can be rotated about the shaft axis, wherein the locking pins can be stressed simultaneously with a tensile force up to a predetermined level in longitudinal shaft direction, without the locking pins disengaging from their holding arrangement in the upper housing part. When the locking pins are inserted into the assigned openings in the base housing body, and when the locking pins are rotated about the longitudinal axis of their shaft, a positive connection of the catch to the base housing body is thus created. As a result, a connection, which can be stressed mechanically, is created between the upper housing part and the base housing body. Only one rotation, which is less than 360°, is necessary to establish the positive connection between the catch on the shaft of the locking pin and the base housing body.

In another aspect of the invention, the locking pin can comprise a head, which is disposed in a head receiving means in the upper housing part, and to which the shaft connects, wherein an opening, through which the shaft of the locking pin extends, is disposed into the head receiving means, wherein the catch or the catches, respectively, preferably engage behind the opening in the base housing body in a positive locking manner. The opening in the upper housing part and the opening in the base housing body can be disposed to as to cover one another, when the upper housing part is disposed on the base housing body. The locking pin can thus be guided through the respective opening in the upper housing part and base housing body, so as to subsequently carry out the rotation of the locking pin. The openings can have a contour, which corresponds to the contour of the shaft and of the at least one catch, so that the shaft can be guided through the openings with the catch. When the locking pin is rotated, the catch engages behind the opening, so that a positive connection can be established between the locking pin and the base housing body.

In another aspect, the head can comprise a lateral stop projection and the head receiving means can comprise a pivot area, in which the stop projection can pivot in response to the rotation of the locking pin, wherein the pivot area is limited by at least one stop in the head receiving means. In particular, the pivot area is limited between two stops, which are embodied in the head receiving means. The stop projection thereby projects into the pivot area, so that the locking pin can only be rotated between the stops. In particular, the pivot area can be limited by means of the stops in such a manner that the locking pin can be rotated between an unlocked position and a locked position, wherein the pivot area is embodied in particular in such a manner by means of the stops that the locking pin can be rotated about an angular range of between 90° and 180°, preferably about an angular range of between 120° and 150°, particularly preferably about an angular range of approximately 135°. A rotatability of 135° thereby corresponds to a ⅜-locking, which a person can carry out manually, without turning over a tool in the locking pin, because a ⅜-rotation can be carried out from the wrist.

To apply a tool to the locking pin, a tool receiving means can be disposed in the locking pin and in particular in the head of the locking pin, in particular a receiving means for a slotted screwdriver or a socket wrench and preferably a receiving means for a Philips screwdriver, so that a rotation can be introduced into the locking pin by inserting a tool into the tool receiving means. By rotating the locking pin between the unlocked position and the locked position, the cross joint of the tool receiving means can form a "+" symbol for a Philips screwdriver, and the cross joint can form an "x" in the locked position. When observing the heads of the locking pins, which are disposed in the head receiving means in the upper housing part, an assembler can tell at a glance, whether the locking pins are in a locked position or in an unlocked position.

The shaft of the locking pin can comprise a collar, and when the shaft is guided through the opening in the head receiving means of the upper housing part, the collar can hold the locking pin on the upper housing part so as to be captively mounted. The opening of the head receiving means is thereby located between the collar and the head of the locking pin, so that, even when the locking pin is not anchored in a positive manner in the base housing body, the locking pin is held on the upper housing part so as to be captively mounted. The collar can be formed such that the collar of the locking pin must be pushed through the opening with an assembly force, which must be overcome, without creating deformations, which remain on the opening or on the collar.

In another aspect, the catch can touch and brush over a holding surface, against which the catch is held, when engaging behind the opening in the base housing body by rotating the locking pin. The holding surface can be designed in a flat manner or preferably comprising an incline in such a manner that, in response to a rotation of the locking pin, the latter is pulled further into the opening in the base housing body. In particular, two catches can be disposed on the shaft of the locking pin, and, corresponding to two catches, two holding surfaces can form the rear side of the opening in the base housing body. The holding surfaces comprise a shape according to a helix, and once the shaft has been guided through the opening in the base housing body with the catches, and once the rotational movement is introduced into the locking pin, the catches brush over the holding surfaces and travel diagonally upward along them. Due to the upward travel of the catches on the holding surfaces, the locking pin is pulled further into the base housing body, whereby a fixed connection is created between the upper housing part and the base housing body. In particular, the holding surfaces can comprise a stop position in the locked position, by means of which an self-acting reverse rotation of the locking pin along the holding surfaces is prevented. The holding surfaces can thereby be formed in one piece with the base housing body, which is produced by means of a die casting process, for example. In particular, the base housing body can comprise hollow chambers behind the openings, so that a base housing body comprising the openings and the holding surfaces can be produced in a one-step casting process.

In another aspect, the opening in the head receiving means in the upper housing part and/or the opening in the base housing body comprises an opening contour, which corresponds to the cross section of the shaft and the at least one catch, wherein preferably two catches are disposed on the shaft, in particular opposite one another. The openings thus comprise a circular shape comprising two indentations, which are located opposite one another, and the locking pin must be guided through the openings in the rotational position, in which the catches correspond to the indentations.

In another aspect a rope seal, preferably comprising a contour, which is formed so as to be closed, is disposed between the base housing body and the upper housing part. By rotating the locking pin and by pulling the locking pin into the opening in the base housing body, which can be attained therewith, the rope seal can be pressed together, so as to attain a desired sealing effect between the upper housing part and the base housing body. For example, the rope seal can be inserted or injected in a groove in at least one housing part, and can be squeezed through the opposite housing part. In particular, the locking pins can be disposed with their corresponding openings outside of the closed contour of the rope seal, and the housing of the signaling device can be classified by the protection class IP66 according to DIN EN 60529, for example.

In another aspect, which improves the signaling device, a guide arrangement can be provided, by which the upper housing part is guided when joining the upper housing part to the base housing body. The guide arrangement can comprise at least one guide spring and at least one guide groove, wherein the guide spring is inserted into the assigned guide groove by joining the upper housing part to the base housing body. For example, four guide springs, which form a rectangle and which engage with four guide grooves on the upper housing part, which also form a rectangle, can be disposed on the base housing body, when the upper housing part is joined to the base housing body.

In another aspect, the guide arrangement comprises a plurality of guide springs and a plurality of guide grooves, which are respectively assigned to each other, wherein at least one guide spring comprising a differing geometry is assigned to at least one guide groove comprising a correspondingly differing geometry, so that the upper housing part can be disposed on the base housing body only when the guide spring comprising the differing geometry is joined with the guide groove comprising the likewise differing geometry. It can be prevented thereby that an assembler assembles the upper housing part on the base housing body in an unsuitable position.

In another aspect, provision can also be made for the locking pin and/or the base housing body and/or the upper housing part to be formed for arranging a sealing in such a manner that the upper housing part can be released from the base housing body only by means of a manipulation of the sealing. For example, the locking pin can be stopped from being able to rotate by means of the sealing, so that the locking pin can only be transferred from the locked position into the unlocked position by means of destroying the sealing.

In another aspect, the material of the locking pin can be formed such that an adhesion to the upper housing part and/or to the base housing body, in particular in contact with the holding surface is created, so that a self-acting rotation of the locking pin is prevented. In particular, the locking pin is made of a one-piece plastic component. The adhesion can prevail between the head of the locking pin and the contact surface of the head in the head receiving means of the upper housing part, which edges the opening in the head receiving means. However, the adhesion can in particular also be advantageous between the catches and the holding surface, so that a loosening of the locking pin out of the locked position is already prevented by means of the adhesion.

PREFERRED EMBODIMENT OF THE INVENTION

Further measures, which improve the invention, will be illustrated in more detail below together with the description of a preferred exemplary embodiment of the invention by means of the figures. Schematically, FIG. 1 shows a partial area of a signaling device in a sectional view;

Figure 1:
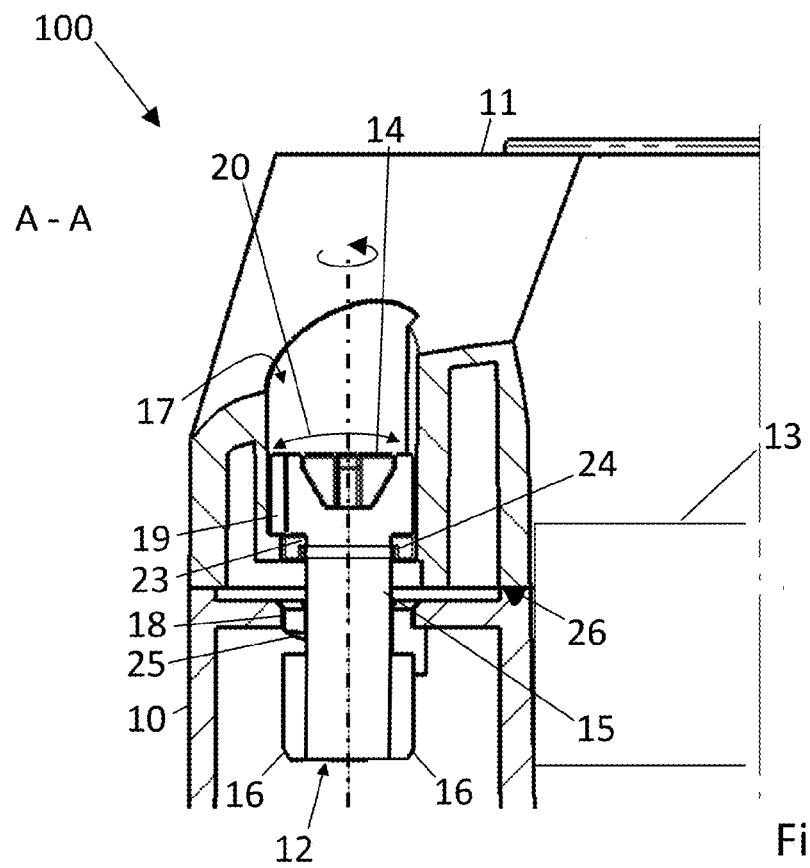
Figure 2:
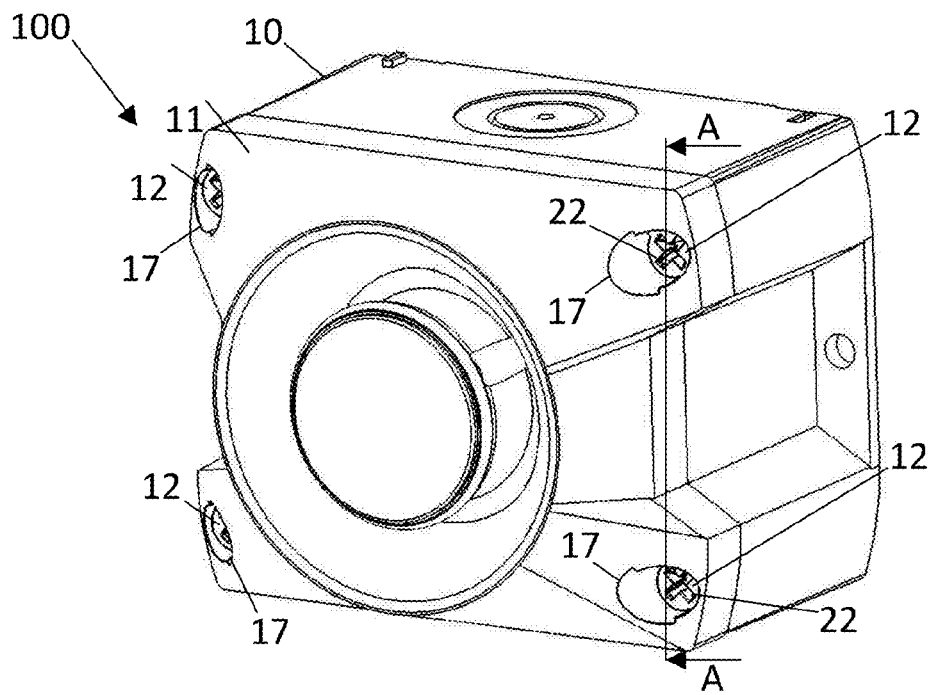
FIG. 2 shows a signaling device in a perspective view.

FIG. 1 shows an embodiment of a signaling device 100 in a cross-sectional view along the cut surface A-A in FIG. 2. Shown is the housing of the signaling device 100, which comprises a base housing body 10, and an upper housing part 11 in the form of a housing cover is disposed on the base housing body 10. A receiving space, in which an electrical component assembly 13 is disposed, is formed through this in the interior of the housing. The electrical component assembly 13 serves to generate signals and can comprise a signal-generating means, for example.

To fasten the upper housing part 11 to the base housing body 10, provision is made for connection means, and the connection means are formed as locking pins 12 according to the invention. A locking pin 12 is shown by means of the sectional view of the signaling device 100, and the upper housing part 11 can be fastened to the base housing body 10 by means of a total of four locking pins 12, which are disposed in the respective corners of the signaling device 100.

The locking pin 12 comprises a head 14, and a shaft 15 connects to the head 14. Two catches 16 are disposed on the shaft 15, and the catches 16 extend diagonally to the longitudinal axis of the shaft 15. The head 14 of the locking pin 12 is disposed in a head receiving means 17 in the upper housing part 11, and the head receiving means 17, on the bottom side, comprises an opening 23, through which the shaft 15 is guided. On the base housing body 10 an opening 18 is provided, through which the shaft 15 extends as well. When the locking pin 12 is assembled, it is guided through the openings 23 and 18, wherein the openings 23 and 18 comprise a contour, which allows the locking pin 12 with the shaft 15 and the catches 16 to be guided through in a designated rotational position about the longitudinal axis of the shaft 15 of the locking pin 12. When the locking pin 12 is guided through, it can be rotated about its longitudinal axis, and the catches 16 engage behind the opening 18, and act against a holding surface 25.

The shaft 15 of the locking pin 12 comprises a collar 24, and when the shaft 15 is guided through the opening 23 in the head receiving means 17 of the upper housing part 11, the collar 24 can hold the locking pin 12 on the upper housing part 11 so as to be captively mounted. The opening 23 of the head receiving means 17 is thereby located between the collar 24 and the head 14 of the locking pin 12, so that, even when the locking pin 12 is not anchored in a positive manner in the base housing body 10, the locking pin 12 is held on the upper housing part 11 so as to be captively mounted.

The locking pin 12 must be rotated for engaging behind the opening 18 in the base housing body 10 and for contacting the holding surface 25 by means of the catches 16, and the rotation is carried out between an unlocked position and a locked position. The rotation is limited by a stop projection 19 on the head 14, which can pivot into a defined pivot area 20 in the head receiving means 17, when the locking pin 12 is rotated about its longitudinal axis. The pivot angle of the pivot area 20 according to the shown embodiment is thereby 135°.

A rope seal 26, preferably comprising a contour, which is formed so as to be closed, is disposed between the base housing body 10 and the upper housing part 11. By rotating the locking pin 12 and by pulling the locking pin 12 into the opening 18 in the base housing body 10, which can be attained therewith, the rope seal 26 can be pressed together, so as to attain a desired sealing effect between the upper housing part 11 and the base housing body 10.

FIG. 2 shows a perspective view of the signaling device 100 for emitting an acoustic and/or visual signal comprising a base housing body 10 and an upper housing part 11, and four locking pins 12, which are disposed in assigned head receiving means 17, which are positioned in the upper housing part 11, are shown for connecting the upper housing part 11 to the base housing body 10. In their heads, the locking pins 12 comprise tool receiving means 22, which are embodied as tool receiving means for Philips screwdrivers in an exemplary manner.

Figure 3:
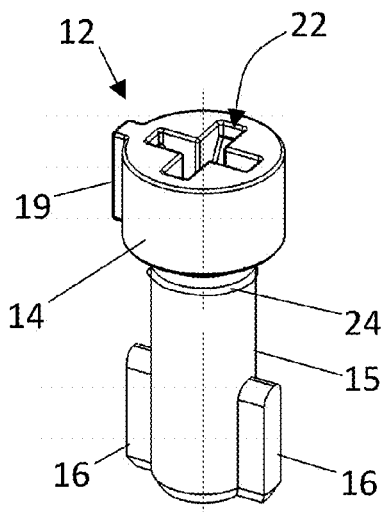
FIG. 3 shows a view of a locking pin.

In a perspective view, FIG. 3 shows a locking pin 12 comprising the head 14, the shaft 15 and two catches 16, which are provided on the shaft 15 in an opposite arrangement. The locking pin 12 is made in one piece from a plastic component, for example in the die casting process. The stop device 19, which can pivot in the pivot area 20 in the head receiving means 17, is shown on the head 14.

Figure 4:
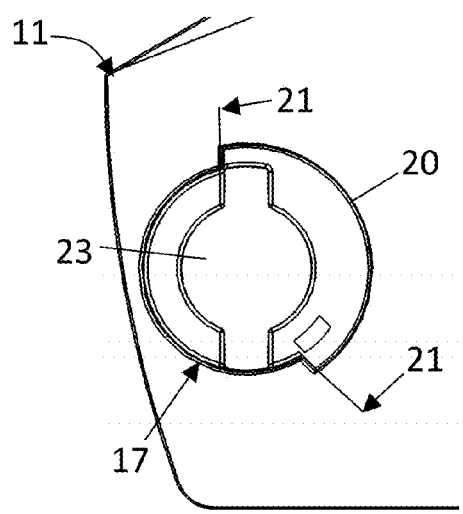
FIG. 4 shows an upper housing part in the area of a head receiving means for receiving the head of a locking pin.

FIG. 4 shows a view of the upper housing part 11 in the area of a head receiving means 17, into which the head 14 of the locking pin 12 can be inserted. The opening 23 for guiding the shaft 15 through with the catches 16 of the locking pin 12 is located in the center in the bottom area of the head receiving means 17, and it is shown that the opening 23 comprises a contour, which corresponds to the cross section of the shaft 15 comprising two catches 16, which are disposed opposite one another. The head receiving means 17 comprises a pivot area 20, which is limited by stops 21 in the head receiving means 17. The stops 21 are positioned in the body contour of the upper housing part 11 on the inner side in the head receiving means 17, and when the head 14 of the locking pin 12 is positioned in the head receiving means 17, the stop projection 19 on the head 14 can pivot in the pivot area 20. The maximum area of rotation of the locking pin 12 can be limited by means of the stops 21, in that the stop projection 19 can strike against a stop 21 for the unlocked position and against a stop 21 for the locked position. The opening angle of the stops 21, by means of which the pivot area 20 is defined, is shown in an exemplary manner with an angle of 135°.

Figure 5:
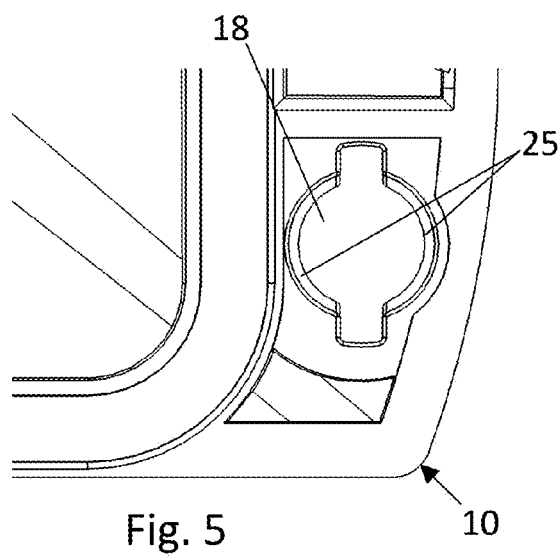
FIG. 5 shows a bottom view of the opening in the base housing body.

FIG. 5 shows a view of the base housing body 10 from the bottom side of the opening 18, at which the holding surfaces 25 are located. The opening 18 also comprises a contour, which corresponds to the cross section of the shaft 15 comprising the catches 16 in opposite position. Once the shaft 15 has been guided through the opening 18 with the catches 16, and when the locking pin 12 is rotated about its longitudinal axis, the catches 16 can come into contact with the holding surfaces 25, wherein the holding surfaces 25 edge the opening 18 on both sides, so that its own holding surface 25 is assigned to each catch 16 in the case of two catches 16. The holding surfaces 25 comprise an incline, which has the effect that the locking pin 12 can be pulled further into the opening 18 by a rotation of the locking pin 12 and when the catches 16 brush over the holding surfaces 25.

Figure 6:
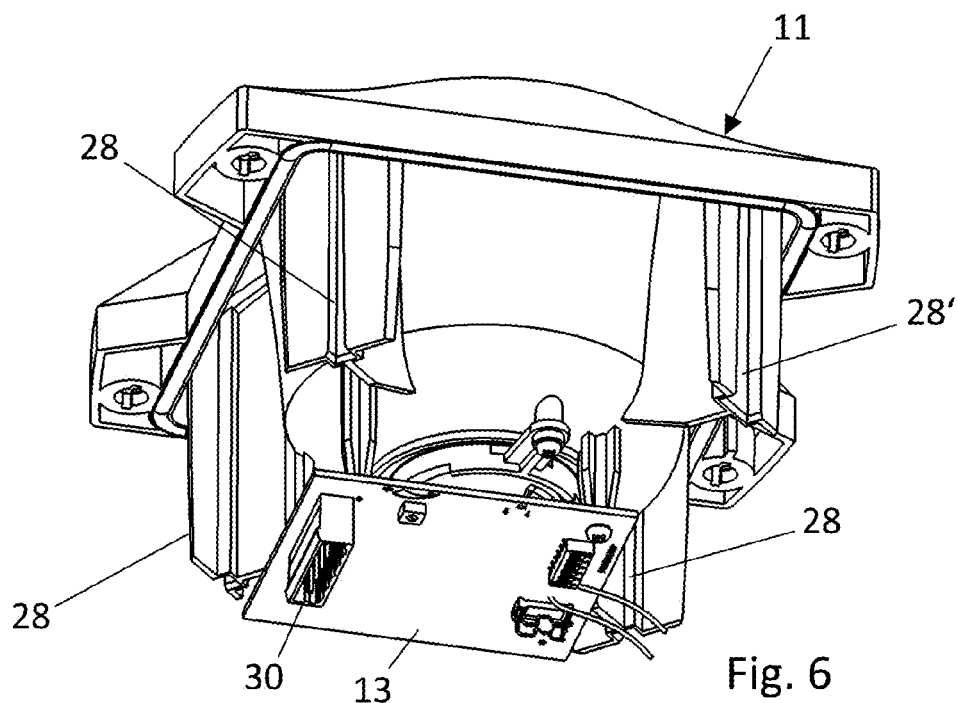
FIG. 6 shows an embodiment of an upper housing part comprising guide grooves.
Figure 7:
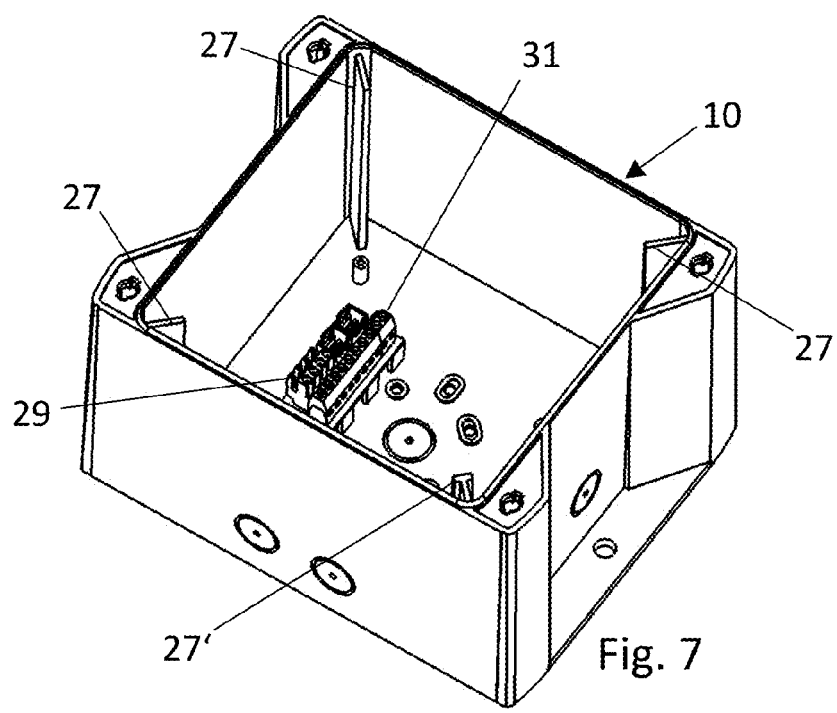
FIG. 7 shows an embodiment of a base housing body comprising guide springs, which form a guide arrangement with the guide grooves in the upper housing part.

FIGS. 6 and 7 show the upper housing part 11 and the base housing body 10 in each case in a perspective view. Guide grooves 28, which extend along an assembly direction when the upper housing part 11 is assembled with the base housing body 10, are disposed on the upper housing part 11. Guide springs 27, which correspond to the guide grooves 28 and which engage with the guide grooves 28 when the upper housing part 11 is joined with the base housing body 10, are disposed on the base housing body 10. It is shown that a guide groove 28' comprises a differing geometry, which must correspond to a differing geometry of a guide spring 27', so that the upper housing part 11 can be assembled to the base housing body 10. It is ensured through this that the upper housing part 11 is assembled in a correct position with the base housing body 10, for example when a plug-in contact partner 29 on the base housing body 10 must be joined to a plug-in contact partner 30 on the upper housing part 11, so as to create an electrical contacting of the electrical component assembly 13 with a line connection means 31, for example.

The embodiment of the invention is not limited to the above-specified preferred exemplary embodiment. Instead, a number of alternatives is possible, which uses the illustrated solution even in the case of embodiments, which are different on principle. All of the features and/or advantages, which follow from the claims, the description or from the drawings, including structural details, spatial arrangements and method steps, can be significant for the invention, either alone as well as in a variety of combinations.

What is claimed is:

1. A signaling device for emitting an acoustic and/or visual signal, comprising a base housing body and an upper housing part, and a connection means for connecting the upper housing part to the base housing body, wherein a receiving space is formed of the base housing body and the upper housing part, wherein in said receiving space at least one electrical component assembly is disposed, wherein the connection means includes four locking pins, which are disposed in respective corners of the signaling device and which can be disposed in a retaining manner on the upper housing part, wherein the locking pins each comprise a shaft, which can be inserted into a respective assigned opening in the base housing body and on which at least one catch is disposed, wherein the locking pins can be locked in the base housing body with the catch by means of a rotation about a partial angle of a full circle, wherein the locking pin comprises a head, which is disposed in a head receiving means in the upper housing part, and to which the shaft connects, wherein an opening, through which the shaft of the locking pin extends, is disposed in the head receiving means, wherein the head comprises a lateral stop projection and wherein the head receiving means comprises a pivot area, in which the stop projection can pivot when rotating the locking pin, wherein the pivot area is limited by at least one stop in the head receiving means.

2. The signaling device according to claim 1, wherein the catch engages behind the opening in the base housing body in a positive locking manner.

3. The signaling device according to claim 1, wherein the pivot area is limited by means of the at least one stop in such a manner that the locking pin can be rotated between an unlocked position and a locked position, wherein the pivot area is embodied in particular in such a manner by means of the at least one stop that the locking pin can be rotated about an angular range of between 120° and 150°.

4. The signaling device according to any one of the preceding claims, wherein a tool receiving means in particular a receiving means for a slotted screwdriver or a socket wrench is disposed in the locking pin, in particular in the head of the locking pin, so that a rotation can be introduced into the locking pin by inserting a tool into the tool receiving means.

5. The signaling device according to claim 1, wherein the shaft is guided through an opening in the head receiving means, wherein the locking pin comprises a collar, which is disposed on the shaft, so that the opening is enclosed in the head receiving means between the head and the collar, whereby the locking pin is disposed on the upper housing part so as to be captively mounted.

6. The signaling device according to claim 1, wherein the catch brushes over and is held against a holding surface when engaging behind the opening in the base housing body by rotating the locking pin, said holding surface being designed comprising an incline in such a manner that, when rotating the locking pin, the locking pin is pulled further into the opening in the base housing body.

7. The signaling device according to claim 1, wherein the opening in the head receiving means in the upper housing part and/or the opening in the base housing body comprises an opening contour, which corresponds to the cross section of the shaft and the at least one catch.

8. The signaling device according to claim 1, wherein a rope seal is disposed between the base housing body and the upper housing part, wherein the rope seal is pressed together by rotating the locking pin and by pulling the locking pin into the opening in the base housing body, which can be attained by rotating the locking pin.

9. The signaling device according to claim 1, wherein a guide arrangement is provided, by means of which the upper housing part is guided when joining the upper housing part to the base housing body.

10. The signaling device according to claim 9, wherein the guide arrangement comprises at least one guide spring and at least one guide groove, wherein the guide spring is inserted into the assigned guide groove by joining the upper housing part to the base housing body.

11. The signaling device according to claim 10, wherein the guide arrangement comprises a plurality of guide springs and a plurality of guide grooves, which are respectively assigned to each other, wherein at least one guide spring comprising a differing geometry is assigned to at least one guide groove comprising a correspondingly differing geometry, so that the upper housing part can be disposed on the base housing body only when the guide spring comprising the differing geometry is joined with the guide groove comprising the different geometry.

* * * * *